United States Patent Office 3,411,422
Patented Nov. 19, 1968

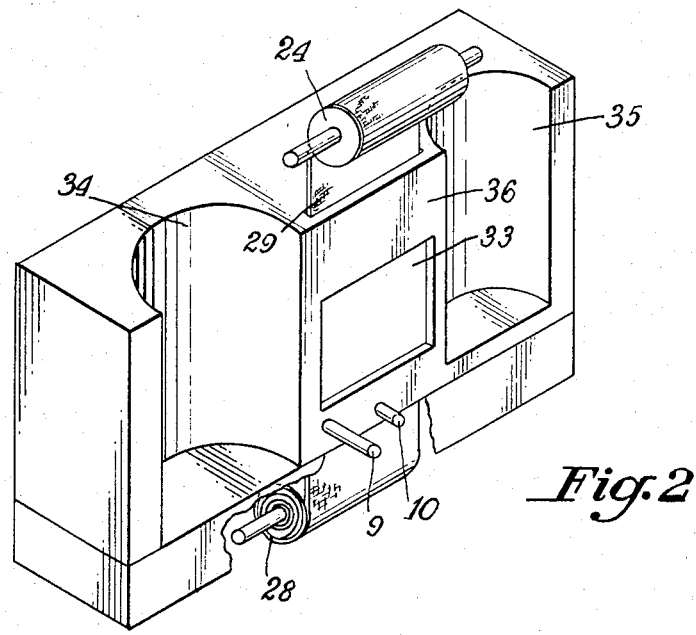
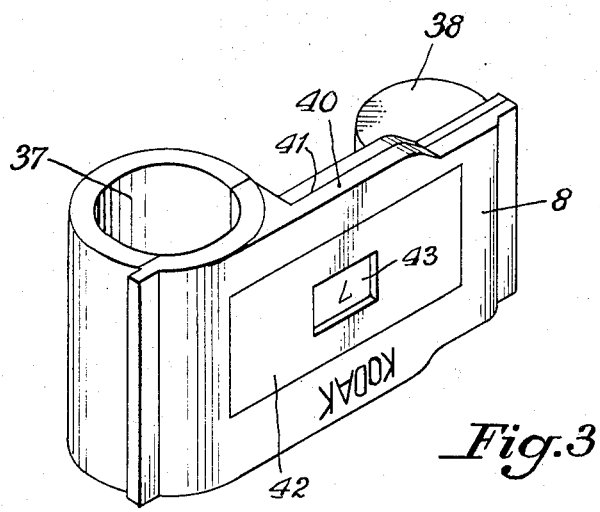

3,411,422
MIRROR REFLEX CAMERA WITH
CENTRAL SHUTTER
Edgar Sauer, Stuttgart-Rohr, Germany, assignor to Zeiss Ikon Aktiengesellschaft, Stuttgart, Germany, a corporation of Germany
Filed Aug. 24, 1966, Ser. No. 574,655
Claims priority, application Germany, Sept. 1, 1965,
Z 11,732
4 Claims. (Cl. 95—42)

The invention relates to a mirror reflex camera which is provided with a central shutter. It is an object of the invention to construct such a camera in such a manner that it may be employed for the use of film cartridges which are provided on both ends, between the picture window arranged in a bridge portion, with forwardly projecting film spool chambers.

In view of the employment of this particular film cartridge, it appeared heretofore necessary to enlarge the depth dimension of the camera in order to accommodate the forwardly projecting film spool chambers of the film cartridge. This, however, has also the disadvantage that it would be necessary to extend the intercept length of the camera objectives to be employed within the camera, or on the other hand, it would not be possible to employ camera objectives having a short intercept length.

In accordance with the invention, these difficulties are overcome, and it is now possible to construct mirror reflex cameras having a central shutter which employ the mentioned film cartridge in that in place of the conventional light-protective flap a light-protective curtain is used which moves in a vertical direction or at a right angle to the direction in which the film is moved by the film advancing mechanism in the camera, while in place of the conventional pivotally mounted reflecting mirror in the camera and the operating mechanism therefor there is used an elevator arrangement which moves the reflecting mirror substantially parallel upwardly and downwardly with respect to picture plane until in the uppermost position it tilts somewhat and comes to lie flat against the customary focusing plate which forms a portion of the viewfinder.

In accordance with a particular embodiment of the invention, the movement of the reflecting mirror is accomplished by bands which are attached to the carrier of the reflecting mirror. These bands are attached at both their ends to drive rollers, and between their ends are guided in stationary grooves provided in the camera chamber. The upper rollers of the mirror control mechanism are arranged in the upper part of the camera casing, namely laterally of the roof edge prism of the finder. The upper roller of the light-protective curtain is arranged in the space between the upper wall of the film cartridge and the ocular of the viewfinder. The two lower rollers of the mirror control mechanism and the light-protective curtain are arranged in the lower part of the camera casing, namely in the space between the scanning member for the film advance mechanism and the scanning member which engages an exterior mark on the film cartridge for introducing into the camera mechanism the speed of the film which is arranged in the film cartridge.

It is known to provide the upper part of the film cartridge with control means which cooperate with scanning members in the camera. These scanning members in conventional cameras are arranged in the upper part of the chamber which receives the film cartridge. The control means on the film cartridge comprise on the one hand an aperture in the bridge which connects the two film spool chambers and into which aperture a scanning member, arranged in the camera, may enter in order to engage a film perforation which travels past that aperture, so that a double exposure preventing means is operated, while on the other hand the mentioned bridge is provided at a predetermined point with a recess, the position of which indicates the speed of the film which is in the film cartridge (film speed mark). This film speed mark is adapted to be engaged by another scanning member in the camera in order to introduce into the mechanism of the same either semi-automatic or automatic the required exposure factors. If an attempt be made to arrange in a mirror reflex camera such a film cartridge by employing the mentioned scanning mechanism, one would discover that this mechanism would have to extend into the space where the viewfinder is located, which viewfinder comprises a focusing disc, a field lens, a roof top prism and an ocular, and this, of course, would involve an increase of the camera dimensions.

The present invention overcomes also this difficulty by arranging the scanning member for controlling the film advance and the scanning member which engages the film speed mark on the film cartridge in the lower part of the camera casing, and as a result thereof, it is necessary to rotate the film cartridge about 180°, or in other words, to insert it upside down into the camera casing.

Still another object of the invention is to arrange in a mirror reflex camera the space for receiving the film cartridge in such a manner that an incorrect insertion of the film cartridge is impossible. This is accomplished in simple manner by making the recesses in the camera which receive the film spool chambers of the film cartridge of such a size that they fit properly the film spool chambers of which one has a larger diameter than the other. It is known that the film spool chamber which contains a film spool for winding up the film by means of a film advancing lever has a greater diameter than the film spool chamber which contains the unexposed film spool. Accordingly, the recesses in the camera which receive the film chambers of the film cartridges are provided with different diameters arranged in such a manner that the film cartridge can only be inserted into the camera when arranged upside down.

With these and other objects in view, the invention will now be described in greater detail with reference to the accompanying drawing, in which:

FIG. 2 illustrates diagrammatically in a perspective view a rear view of the camera body without the camera objective and without the viewfinder system; and FIG. 3 illustrates diagrammatically a rear view of the film cartridge in its inverted position in which it is inserted in the camera.

Figure 1:
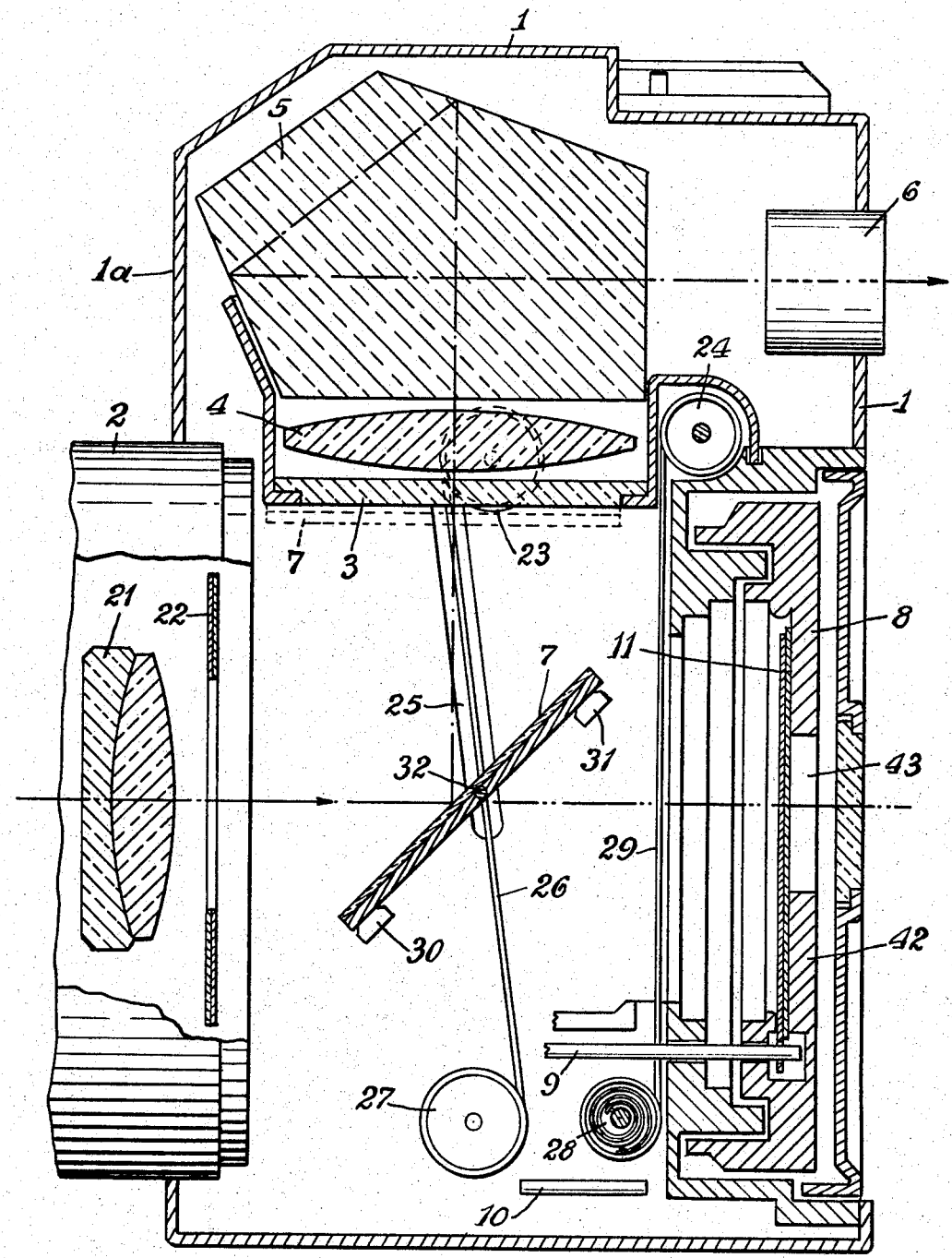
FIG. 1 illustrates a centrally disposed vertical sectional view of the camera.

Referring to FIG. 1, the camera casing 1 is provided on its vertical front wall 1a with a tubular mount 2 which contains not only the camera objective but also the diaphragm mechanism and a central shutter. This FIG. 1 discloses, however, only the rear member 21 of the camera objective, while the shutter leaves of a central shutter arranged in rear of the camera objective are indicated at 22. This type of tubular mount 2 is particularly intended for the use of exchangeable camera objectives. The upper part of the camera contains the viewfinder device comprising a focusing disc 3, a picture field lens 4, a roof top prism 5, as well as an ocular 6 which latter is only indicated diagrammatically. Within the camera casing is arranged an inclined reflecting mirror 7. A film cartridge 8 is adapted to be inserted in conventional manner from the rear of the camera casing. The picture plane is indicated with 11 and along this plane is movable in a horizontal direction the film from one spool chamber to the other (see FIG. 3).

The scanning members 9 and 10 for the film advancing mechanism and for the film speed mark are arranged in the lower part of the camera casing. The particular position of the speed indicating mark and the film cartridge is determined by the particular film speed of the film cartridge. Since the scanning members 9 and 10 are arranged in the lower part of the camera, it is required that the film cartridge be rotated about 180°, or in other words, it has to be inserted upside down in the camera casing. In this manner the space for the viewfinder remains unlimited and any increase in the camera dimensions is avoided.

In order to be able to employ with the camera an objective having a short intercept length, the invention provides that the conventional light-protective flap in front of the film is replaced by a light-protective curtain 29 which moves in a vertical direction, while in place of the customary pivotally mounted reflective mirror, the present invention employs a reflective mirror 7 which is arranged to be moved substantially vertically and parallel to the film plane for which purpose there is arranged an elevator guide mechanism. The drive rollers for the light-protective curtain are designated with 24 and 28, and the rollers for the elevator of the mirror are designated with 23 and 27. The mirror 7 is moved upwardly and downwardly by bands 26 which at 32 are guided in guide grooves 25. In the viewing position the inclined mirror 7 rests upon abutments 30 and 31 in the camera chamber.

The drives for the light-protective curtain 29 and for the mirror 7, in customary manner, are operatively connected with the tensioning and release mechanism of the camera, and the arrangement is such that in the viewing position the mirror 7 assumes the inclined position indicated in FIG. 1, and in this position the light-protective curtain 29 is closed. In the picture taking position of the camera, however, the mirror is moved upwardly and lies flat against the focusing disc 3 in a light-proof manner—as shown in dotted line in FIG. 1—while the light-protective curtain 29 is in open position, so that the film in the cartridge can be exposed by the light passing through the camera objective. The two lower rollers 27 and 28 of the mirror operating mechanism and of the curtain respectively, are arranged between scanning member 9 of the film advancing mechanism and the film speed mark scanning member 10. The upper roller 24 of the curtain 29 is arranged between the upper wall of the cartridge and the ocular 6, while the upper rollers 23 for the mirror elevator are arranged laterally of the roof edge prism 5.

Referring to FIG. 2, it will be noted that the light-protective curtain 29 moves in a vertical direction at right angles to the horizontal movement of the film which moves past the picture window 33 arranged in the wall 36 between the recessed cartridge chambers 34 and 35 in the camera body.

FIG. 3 illustrates a film cartridge 8, such as a Koda-Pak cartridge, which may be used with the mirror reflex camera of the invention. As illustrated, this cartridge 8 is inserted upside down in the camera. The left-hand film spool chamber 37 is larger and receives the exposed film and is adapted to be received by the larger recess 34 of the camera. The right-hand film spool chamber 38, which contains the unexposed film, is smaller in height than the film spool chamber 37 and also has a smaller diameter than the latter. This smaller film spool chamber is received by the correspondingly dimensioned recess 35 in the camera. The different sizes of the film chambers prevent a wrong insertion in the camera. The two film spool chambers 37 and 38 are connected with each other by a straight bridge portion 40. The center line, which indicates the picture plane, is indicated by the line 41. The film moves horizontally from the chamber 38 to the chamber 37. The rear wall 42 of the cartridge 8 is provided with a window 43 in which appear picture numbers which are arranged on a light-proof backing strip on which the film is attached.

What I claim is:

1. In a mirror reflex camera provided with a central shutter and a film advancing means, the combination with a film cartridge provided at its ends with film spool chambers connected with each other by a bridge provided with a picture window, said film spool chambers projecting laterally from said bridge and extend forwardly into the camera when the film cartridge is inserted from the rear into the camera, a light-protective curtain in front of the window in said cartridge, means for moving said curtain in a direction at right angles to the direction the film in said cartridge is moved by said film advancing means, a reflecting mirror in said camera, and means comprising an elevator mechanism for bodily moving said mirror substantially parallel to said curtain from a light ray reflecting position to a position in which the light rays entering the camera through its objective will reach the film in the picture window in said bridge of said cartridge.

2. A mirror reflex camera according to claim 1, in which said elevator mechanism includes bands, the ends of which are attached to rollers mounted in the upper part and the lower part of the camera, and means between the ends of said bands for connecting the latter with said reflecting mirror.

3. A mirror reflex camera according to claim 1 with a viewfinder having a roof top prism arranged in the upper part of the camera and in which said elevator mechanism includes bands, the ends of which are attached to rollers mounted in the upper part and the lower part of the camera, and means between the ends of said bands for connecting the latter with said reflecting mirror, the rollers in the upper part of the camera are arranged laterally of said roof top prism.

4. A mirror reflex camera according to claim 1 with a viewfinder provided with an ocular arranged in the upper part of the camera, and in which said light-protective curtain is attached with its ends to rollers arranged in the upper and lower parts respectively, of said camera, the upper one of said rollers being arranged between said ocular and the upper limit of the cartridge inserted in said camera.

References Cited

UNITED STATES PATENTS

| | | | |
|---|---|---|---|
| 3,083,627 | 4/1963 | Naumann et al. | 95—57 |
| 3,101,657 | 8/1963 | Böhm et al. | 95—42 |

NORTON ANSHER, *Primary Examiner.*

C. B. FUNK, *Assistant Examiner.*